Figure 1:
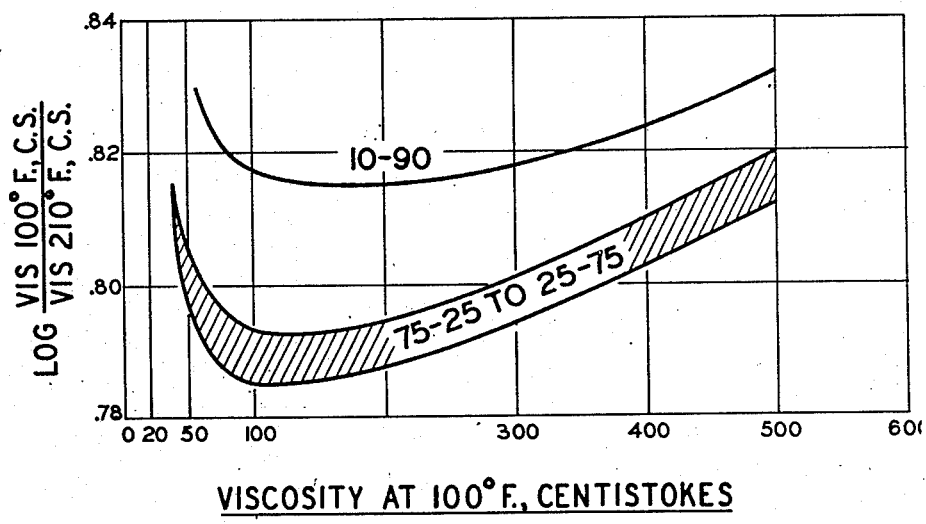

Aug. 19, 1947.   W. J. TOUSSAINT ET AL   2,425,845
MIXTURES OF POLYOXYALKYLENE DIOLS AND METHODS OF MAKING SUCH MIXTURES
Filed April 21, 1945   2 Sheets—Sheet 1

INVENTORS
WALTER J. TOUSSAINT
HARVEY R. FIFE
BY
ATTORNEY

VISCOSITY-DENSITY OF MIXTURES OF HETERIC OXYETHYLENE-OXY 1,2 PROPYLENE DIOLS AT 210°F.

INVENTORS
WALTER J. TOUSSAINT
HARVEY R. FIFE

UNITED STATES PATENT OFFICE 2,425,845

MIXTURES OF POLYOXYALKYLENE DIOLS AND METHODS OF MAKING SUCH MIXTURES

Walter J. Toussaint, South Charleston, W. Va., and Harvey R. Fife, Mount Lebanon, Pa., assignors to Carbide and Carbon Chemicals Corporation, a corporation of New York Application April 21, 1945, Serial No. 589,646

16 Claims. (Cl. 260—615)

This invention relates to mixtures of dihydroxy polyoxyalkylene compounds which are glycols or diols. It is more particularly concerned with mixtures having a relatively high average molecular weight and comprising molecules containing polyoxyalkylene chains formed predominantly of the oxyethylene group, $-OC_2H_4-$, and the oxy 1,2-propylene group, $-OC_2H_3 \cdot CH_3-$. Such mixtures may result, for instance, from the reaction of aliphatic diols or glycols, with alkylene oxide mixtures containing, for the most part, ethylene oxide and 1,2-propylene oxide. The invention includes novel mixtures of the polyoxyalkylene diols and methods of making such mixtures.

Polyethylene glycols or polyoxyethylene diols, $H(OC_2H_4)_xOH$, of relatively high molecular weight are known. These diols may be obtained by the addition of ethylene oxide, $C_2H_4O$, to water or to an ethylene glycol of lower molecular weight; for instance, ethylene glycol, diethylene glycol, triethylene glycol and the like. The resulting reaction products are believed to be complex mixtures of glycol molecules of various molecular weights, depending on the length of the polyoxyethylene chain, $-(OC_2H_4)_x-$, which is built up by the addition of the oxyethylene group, $-OC_2H_4-$, to the individual molecules. As far as is known to us, these addition products have not been resolved into identifiable constituents, except possibly in the case of readily distillable products of low molecular weight. Depending upon the molecular weight, the melting or fusion temperatures of these products are given as ranging from about $-50°$ to $+10°$ C., for an average molecular weight of about 200–300, up to about 60° to 65° C. for an average molecular weight of about 3,000–4,000. At normal room temperatures, the polyoxyethylene glycols of an average molecular weight of about 600 to 800 have the consistency of a semi-fluid, pasty mass. Below this range of molecular weight the products are clear, colorless, normally-liquid compositions which are miscible with water in all proportions. At and above an average molecular weight of about 800–900, the polyoxyethylene glycols are low-melting, normally-solid mixtures having fusion temperatures which increase with molecular weight from about 30° C. to a maximum of 60° to 65° C. Polyoxyethylene glycol mixtures having a fusion temperature above 60° to 65° C. have not been obtained, to our knowledge. The normally-solid polyoxyethylene glycols are said to be miscible with water in all proportions.

The average molecular weights of glycol addition products of the kind referred to above, as determined by the ebullioscopic method or calculated from viscosity measurements or acetyl values, are often lower than those calculated from the amount of ethylene oxide entering into the reaction. The difference may be accounted for by a number of factors including the isomerization of ethylene oxide to acetaldehyde, side reactions arising out of the presence of aldehydes and other impurities in the reactants, and the starting of oxyethylene compounds of low molecular weight during the course of the addition reaction.

Although ethylene oxide addition products have been suggested for use as lubricants, their high-melting or solidification temperatures make them unsuitable as metal lubricants where fluidity over a wide range of temperature is required. As far as we are aware there are no satisfactory solvents which will retain the polyoxyethylene glycols in solution at the sub-zero temperatures to which they may be subjected in service. In textile lubrications where they may be used in aqueous solution, a tendency for a solid polyoxyethylene glycol and a solvent or diluent to separate to an objectionable extent has been observed.

Prior disclosures with respect to the use of 1,2-propylene oxide for the formation of addition products fail to describe properties which would permit identification of such products as alcohols having one or more hydroxyl groups, according to the number of hydroxyl groups in the starting material employed. True diols of low molecular weight in the polypropylene glycol series may be prepared by eliminating a molecule of water from the monoglycols or diglycols, and mixed glycols of low molecular weight may be obtained by the same procedure. The diglycols, triglycols, tetraglycols and the like which are thus obtained are water-soluble liquids, for instance, di- and tri-propylene glycols; ethylene propylene diglycol, $HOC_2H_4OC_3H_6OH$; ethylene butylene diglycol, $HOC_2H_5OC_4H_8OH$; and ethylene propylene ethylene triglycol, $HOC_2H_4OC_3H_6OC_2H_4OH$.

We have found that useful and improved polyoxyalkylene compositions of relatively high average molecular weight which are mixtures of polyoxyalkylene diols may be obtained by the reaction, with an aliphatic dihydroxy alcohol, of a mixture of ethylene oxide and 1,2-propylene oxide containing at least one-third part of 1,2-propylene oxide for each part of ethylene oxide, by weight. The reaction which takes place between the aliphatic dihydroxy alcohol starting material and the ethylene oxide and 1,2-propylene oxide seems to be a simple addition wherein the alkylene oxide molecules are converted to the corresponding oxyalkylene groups or radicals. The aliphatic dihydroxy alcohol may itself be regarded as the reaction product of water with an aliphatic oxide or ether in accordance with the following general equation:

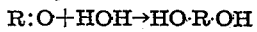
R:O+HOH→HO·R·OH wherein R is a divalent aliphatic group such that the OH groups are alcoholic and attached to different carbon atoms thereof. When the aliphatic dihydroxy alcohol is a glycol of the ethylene glycol or 1,2-propylene glycol series, water may be regarded as the ultimate starting material, and for any given molecule of the resultant mixture the reaction may be illustrated by the general equation as follows:

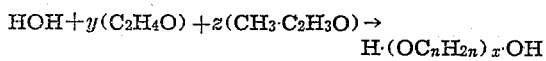
$$HOH + y(C_2H_4O) + z(CH_3 \cdot C_2H_3O) \rightarrow H \cdot (OC_nH_{2n})_x OH$$

wherein $y$ and $z$ represent the moles of ethylene oxide and propylene oxide respectively; $n$ is both 2 and 3 in a single molecule, the number of times $n$ has a value of 2 being equal to $y$ and the number of times $n$ has a value of 3 being equal to $z$; and $x$ is the total number of the oxyethylene and oxy 1,2-propylene groups, being equal to the sum of $y$ and $z$.

From such properties as average molecular weight, refractive index, density, viscosity, rate of change of viscosity with change in temperature, as well as upon theoretical considerations, it appears that the compositions which may be obtained by the reaction of the mixture of ethylene oxide and 1,2-propylene oxide with an aliphatic dihydroxy alcohol are complex mixtures of polyoxyalkylene diols, having polyoxyalkylene chains of different lengths and different internal configuration with the hydroxyl groups appearing at the ends of the chains, and containing in a single molecule both the oxyethylene group and the oxy 1,2-propylene group, and if the starting material is other than an ethylene glycol or propylene glycol, the oxyaliphatic radical corresponding to the dihydroxy starting material.

By way of illustration, in a polyoxyalkylene dihydroxy compound in which the only oxyalkylene groups present in the molecule are oxyethylene and oxy 1,2-propylene, a polyoxyalkylene chain of five such groups would have a molecule weight of 234, 248, 262 and 276, respectively, exclusive of the water, depending upon whether one, two, three or four oxy 1,2-propylene groups are present; and in a mixture of such compounds the average molecular weight attributable solely to the oxyalkylene chain would be between 234 and 276, with an oxide ratio corresponding thereto from 75.2–24.8 to 15.9–84.1, respectively. By oxide ratio of the mixture of alkylene oxides is meant the proportion, by weight, of ethylene oxide to propylene oxide present, the proportion of 1,2-propylene oxide being given last as for instance a composition having an oxide ratio of 75–25 being obtainable by using an oxide mixture containing one-third part of 1,2-propylene oxide for each part by weight of ethylene oxide.

Similarly, the molecular weights of the oxyethylene oxy 1,2-propylene chains of dihydroxy compounds having a total of six oxyalkylene groups to the molecule with two, three, four and five oxy 1,2-propylene groups present therein would be 292, 306, 320 and 334, respectively; and in mixtures of such compounds the portion of the average molecular weight attributable solely to the oxyalkylene chain would be between 292 and 334 with an oxide ratio between 60.3–39.7 and 13.2–86.8 corresponding thereto. Compounds having but a single oxy 1,2-propylene group would have an oxyethylene content above that of compositions having a 75–25 oxide ratio and are omitted.

In compounds having a total of seven oxyalkylene groups to the molecule with two, three, four, five or six oxy 1,2-propylene groups present therein, the molecular weight attributable to the oxyethylene oxy 1,2-propylene chain would be 336, 350, 364, 378 and 392, respectively; and in mixtures of such compounds the average molecular weight attributable solely to the polyoxyalkylene chain would be between 336 and 392 with an oxide ratio between 65.5–34.5 and 11.2–88.8 corresponding thereto.

Likewise, in compounds having from two to seven oxy 1,2-propylene groups, in an oxyethylene oxy 1,2-propylene chain of eight oxyalkylene groups, the molecular weights of such chains would be 380, 394, 408, 422, 436 and 450, respectively; and in a mixture of such compounds the average molecular weight attributable to the polyoxyalkylene chain would be between 380 and 450, with an oxide ratio corresponding thereto between 69.5–30.5 and 9.8–90.2. To each of the values for molecular weights and average molecular weights there is to be added a value of 18, the molecular weight of water, to arrive at the corresponding value for either the diol compositions, or for a dihydroxy compound which is a constituent of the composition, as the case may be.

A composition having in admixture none but the diols of the foregoing polyoxyethylene oxy 1,2-propylene chains would comprise as many as nineteen different compounds or constituents, each differing from one another in molecular weight with but a spread of from 252 to 468 in molecular weight and from five to eight oxyalkylene groups between the smallest and largest molecules. Depending upon the relative proportions of the nineteen constituents, the composition would have an oxide ratio between 75–25 and about 10–90, and an average molecular weight between 252 and 468. In the compositions of the present invention the complexity of the mixtures may be due not only to the differences in molecular weights of the constituents, but also to the large number of isomers which may be formed by the random (i. e. interspersed) distribution of the oxyethylene and oxy 1,2-propylene groups, with consequent variations in internal configuration from molecule to molecule, even among those of the same molecular weight. The higher the molecular weight of the compositions the more complex is the mixture. Our novel diol compositions may be referred to as mixtures of heteric oxyethylene oxy 1,2-propylene diols, and by the term "heteric" we mean that the diol constituents of the mixture vary in internal configuration from molecule to molecule, such variation arising out of a randomness of the distribution of the oxyethylene and the oxy 1,2-propylene groups therein, such as results, for instance, from the concurrent reaction of ethylene oxide and the 1,2-propylene oxide on the starting material and the intermediate addition products.

Using ethylene oxide 1,2-propylene oxide mixtures having at least one-third part of 1,2-propylene oxide for each part of ethylene oxide, by weight, and using various aliphatic dihydroxy alcohols as starting materials we have produced a number of polyoxyalkylene diol compositions having oxide ratios from 75–25 to 25–75 with average molecular weights ranging from about 300 upwards, and using oxide ratios of about 9 parts of 1,2-propylene oxide for each part of ethylene oxide, we have made diol compositions having an oxide ratio of about 10–90 and with average molecular weights of about 800 upwards. At ranges of average molecular weights as high as 10,000 to 20,000 they may be obtained as normally liquid compositions which are characterized by a relatively low rate of change of viscosity with change in temperature as compared with other normally liquid diols of approximately the same viscosity for a given temperature, with the actual viscosity as well as such other properties as density, refractive index and the like for a particular diol composition being dependent on such factors as oxide ratio, average molecular weight and the like. For instance, at oxide ratios of 50–50 the absolute density at 210° F. of polyoxyalkylene diol compositions in which the oxyalkylene groups are oxyethylene and oxy 1,2-propylene is approximately 1.0, for average molecular weights from about 400 to 3,500 and upwards. With higher oxypropylene content the absolute density at 210° F. of the composition decreases to a value of about 0.95 for oxide ratios of 10–90; and with an oxypropylene content below 50–50 it increases to a value of about 1.03, over substantially the same ranges of average molecular weights. Over a range of oxide ratios from 75–25 to 25–75 and a range of average molecular weights from about 400 to 2,500 and above, the higher the average molecular weight and the lower the oxy-propylene content of the composition the higher the viscosity. The viscosities appear to lie in a narrow band or zone which, at a temperature of 210° F., for instance, extends from about 3 to 12 centistokes for an average molecular weight of about 300 to 700 to about 40 to 130 centistokes for an average molecular weight from 3,200 to 4,200. For oxide ratios from 50–50 to 10–90, at a temperature of 20° F., the viscosities extend from 700 to 1,200 centistokes at average molecular weights from 300 to 700 up to 5,000 to 14,000 centistokes at average molecular weights from 3,000 to 3,500.

Figure 2:
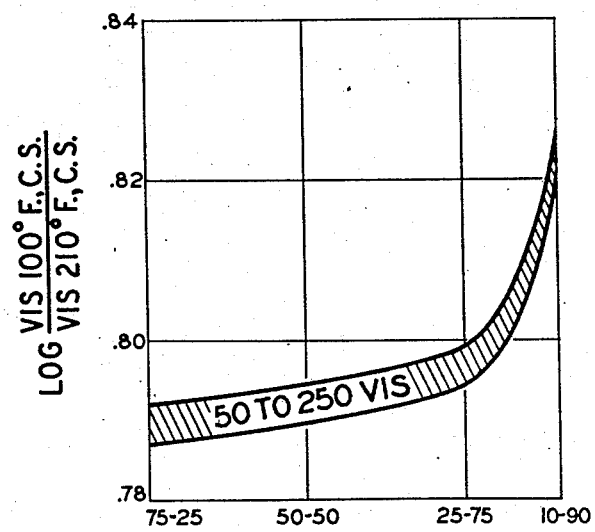

Referring to the drawings, the rate at which the viscosities of certain series of diol compositions change with temperature is illustrated by Figure 1 in which the logarithm of the ratio of the viscosities at 100° F. and 210° F. has been plotted against the viscosity at 100° F. As will be noted, the curves for diol compositions having oxide ratios from 75–25 to 25–75 lie below the curve for an oxide ratio of 10–90. From this it seems to be indicated that for a given viscosity at 100° F., the composition having the higher oxy 1,2-propylene content above an oxide ratio of 25–75 has the higher rate of change in viscosity with temperature. The characteristic is further illustrated by Figure 2 in which the logarithm of viscosities at 100° F. and 210° F. is plotted against the oxide ratio for a number of viscosities at 100° F. Thus, the most rapid increase in viscosity ratio results from increasing the oxy 1,2-propylene content of the diol composition from 25–75 to 10–90. Insofar as the rate at which the viscosity changes with temperature is a determining characteristic, diol compositions having oxide ratios from 75–25 to 25–75 are preferred.

Figure 3:
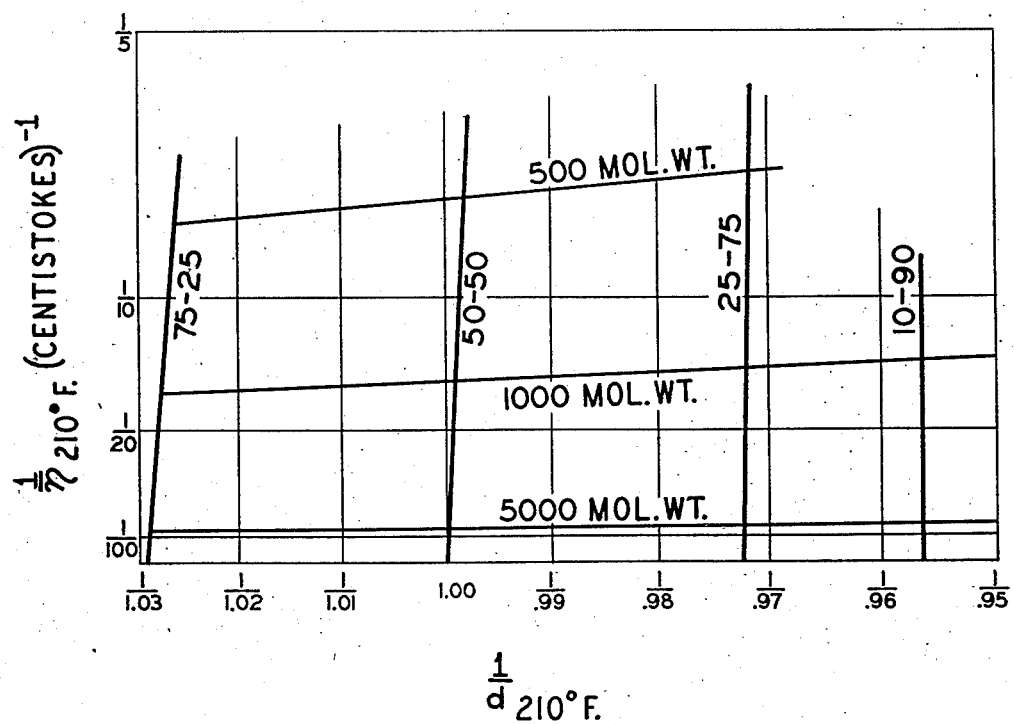

In Figure 3, the reciprocal of the viscosity at 210° F., in centistokes, is plotted against the reciprocal of the absolute density at 210° F. for certain series of diol compositions. These curves are based on published values for fundamental physical constants and in computing the curves the following formulae were used:

$$1/d = \frac{V_1 + \left(\frac{X_2 V_2 + X_3 V_3}{44 X_2 + 58 X_3}\right)(M - 18 - 0.241 MP)}{M - .241 MP}$$

$$1/\eta = 1/\eta_1 \left[\frac{1/d - \left(\frac{X_2 V_2 + X_3 V_3}{44 X_2 + 58 X_3}\right)}{1/d_1 - \left(\frac{X_2 V_2 + X_3 V_3}{44 X_2 + 58 X_3}\right)}\right]$$

in which $V_1$ = Molal volume of water at 210° F.
$V_2$ = Molal volume of —OC$_2$H$_4$— at 210° F.
$V_3$ = Molal volume of —OC$_2$H$_3$·CH$_3$— at 210° F.
$X_2$ = Mole fraction of —OC$_2$H$_4$—
$X_3$ = Mole fraction of —OC$_2$H$_3$·CH$_3$—
$1\eta_1$ = Reciprocal of the viscosity of water in centistokes at 210° F.
$1/d_1$ = Reciprocal of the density of water at 210° F.
$M$ = Molecular weight of the polyoxyalkylene diol composition.
$P$ = Per cent of oxy 1,2-propylene, by weight.

Good agreement between the theoretical curves for the polyoxyalkylene diols and the experimental data for the diol compositions lends confirmation to the presence of two hydroxyl groups to the molecule and the preponderance of such dihydroxy constituents in the diol compositions herein disclosed.

In general, the diol compositions of the present invention in which the oxyethylene content is larger than the oxy 1,2-propylene content exhibit a substantially greater degree of miscibility with water or greater water tolerance than those having a lesser oxyethylene content. By way of illustration, diol compositions in which the oxyalkylene groups are oxyethylene and oxy 1,2-propylene in about a 50–50 oxide ratio are miscible with cold water in all proportions over a range of average molecular weights from about 300 to upwards of 3,000; and up to an average molecular weight of about 450 to 600 they are also miscible in all proportions in hot water up to a temperature of 100° C. Beginning with an average molecular weight of about 600 to 800, depending possibly upon variations in the particular distribution of the oxyethylene and the oxy 1,2-propylene groups within and among the molecules, such compositions are characterized by the property of being miscible with cold water up to a concentration of about 50 per cent or more of the one in the other and relatively immiscible with hot water. At a temperature of about 40° C. to 60° C. or higher, an aqueous solution containing about 50 per cent of such a composition separates into two layers, one of the layers being a solution of water in the diol composition and the other layer being a solution of the diol composition in water.

Diol compositions having an oxide ratio of about 50–50 are useful generally as metal lubricants. As metal lubricants they may be used with non-aqueous viscosity-reducing diluents, and those in the higher ranges of viscosity and average molecular weight are particularly useful as mild extreme pressure lubricants, for instance in gear boxes. They also have adequate cold water solubility for use as textile lubricants in aqueous solution. Because the diol compositions having an oxide ratio from 75–25 to 50–50 exhibit a higher degree of water miscibility than those having a lower oxyethylene content, they may be preferred as textile lubricants, particularly in aqueous solution. They are readily removed by scouring when used for lubrication of woolen or worsted fibers.

Diol compositions in which the oxy 1,2-propylene content is higher than the oxyethylene content are not miscible with water in all proportions at ordinary temperatures except possibly in the lower ranges of average molecular weight, and with increasing temperature even this limited miscibility diminishes. In any particular case, the temperature at which two layers or phases may be formed from a homogeneous diol composition-water system may depend upon a number of factors including the method of making the diol compositions, the average molecular weights and the like. Because of the difficulty of maintaining dry reaction conditions, diol compositions of high average molecular weight made by the addition of alkylene oxides to a glycol starting material may contain a small amount of glycols of low molecular weight from the starting of new chains during the reaction, and the presence of a small amount of such low molecular weight glycols may, in turn, give rise to an erroneous indication of water-miscibility which is not truly characteristic of the mixture of high molecular weight compounds of which the diol composition is predominantly composed.

Over a range of oxide ratios from 50–50 to 25–75 and higher oxy 1,2-propylene content, it appears also that the diol compositions will dissolve more water than water dissolves the compositions. In general, a diol composition having an oxide ratio of about 25–75 and an average molecular weight of about 450 to 550 is completely miscible with cold water (i. e. at a temperature of about 0° to 20° C.) but on heating the aqueous solution to a temperature of about 90° C., two phases separate. Similarly, a composition of about the same oxide ratio but having an average molecular weight of 1,300 to 1,400, approximately, is soluble in cold water to about 30 to 40 per cent by weight. The aqueous solution separates into two phases on heating to a temperature of about 25° to 30° C.

Diol compositions having an oxide ratio from about 50–50 to 10–90 are also characterized by the useful property of remaining in the fluid state at low temperatures, for instance, as low as −50° C. and below. The higher the oxyethylene content of the compositions, the higher the temperature of solidification. Compositions having oxide ratios from 75–25 to 60–40 usually contain a solid phase at temperatures as high as 0° C. and even at temperatures above 10° C., the presence of a solid or crystalline phase may be observed by the haziness or cloudiness of the composition. The temperature at which solidification may take place in any particular case will here again depend upon a number of factors including the average molecular weight, the starting material and, to some extent, the conditions under which the composition is made.

As metal lubricants, diol compositions having an oxide ratio from 50–50 to 10–90 may be preferred for a variety of uses because of its water tolerance at lower temperatures and the lesser solubility of water with increasing temperature. Thus, whenever the amount of water dissolved in the composition becomes undesirably high, it may be expelled merely on heating to the separation temperature. Used as a crankcase lubricant in a compressor or combustion engine operating at a temperature above the separation temperature, the elimination of water may take place during operation. Used as a hydraulic fluid, for instance, in airplane controls, the pressure transmission lines are not readily subject to stoppage arising out of the formation of ice crystals.

In producing the diol compositions of the present invention by the method which involves the addition of a mixture of oxides to a dihydroxy aliphatic alcohol, there may be used as starting material the following: water in an amount as may be determined by a desired average molecular weight of the product to be attained; ethylene glycol; 1,2-propylene glycol; 1,3-propylene glycol; butylene glycols; diethylene glycol; dipropylene glycol; triethylene glycol; tripropylene glycol; as well as other such aliphatic dihydroxy compounds. In general, the higher the average molecular weight of the composition, the less the influence of a particular starting material upon the properties of the ultimate diol compositions; and at an average molecular weight of about 900 to 1,000 and above, the choice of different alkylene glycol starting materials of relatively low molecular weight, that is, below 150, has little effect in producing substantial variations in properties. With a lower monoalkylene glycol such as butylene glycol as the starting material, for instance, the oxybutylene radical having a molecular weight of 72 constitutes only 7.2 per cent or less of a diol composition having an average molecular weight of 1,000 or higher. Diol compositions having an average molecular weight of 1,000 or higher are preferred for use in conjunction with non-aqueous viscosity-reducing diluents.

In preparing the diol compositions by the method of oxide addition, good results may be obtained by bringing a mixture containing the ethylene oxide and the 1,2-propylene oxide into intimate contact with the dihydroxy starting compound in a liquid phase throughout which a suitable catalyst is uniformly dispersed. For best results it is essential that the addition reaction be carried out under conditions which are controlled with respect to such factors as the amount of active catalyst employed and the uniformity of its dispersion, the amount of unreacted alkylene oxides present at any stage during the reaction, the temperature maintained throughout the course of the reaction and the intimacy and uniformity of contact of the oxides with the dihydroxy compounds with which they are to be reacted, particularly in the production of compositions of higher average molecular weight.

As catalyst, sodium hydroxide or potassium hydroxide is preferred in an amount which is about 0.2 to 1.0 per cent by weight of the reactants; that is, the alkylene oxides and the dihydroxy starting material appearing in the reaction product. An amount of active catalyst within this range is not so large as to cause excessive decomposition of the main alkylene oxide addition product. Excellent results have been obtained with an amount of catalyst which is about 0.75 per cent by weight of the reactants. By "active catalyst" is meant the amount of catalyst present which has an alkalinity of the order of that of the alkali metal hydroxides, excluding such compounds of substantially lesser alkalinity as the carbonates and the carboxylic acid salts which may be titratable as hydroxides.

Strongly alkaline catalysts, other than sodium hydroxide and potassium hydroxide may also be used. These strong hydroxides of the alkali metal group may be used in the form of their glycollates, if desired. In general, the stronger the alkalinity of the catalyst the less is required. All of the catalyst need not be added at one time at the start of the reaction. Using strongly alkaline catalysts it is preferred that a suitable amount be added at the start, and the remainder of the catalyst be added from time to time in such amounts as to maintain a substantially uniform catalyst concentration during the reaction.

The reaction should also be carried out at a temperature which is sufficiently high to favor rapid reaction of the alkylene oxides with the starting material and intermediate products or reactants. A rapid reaction rate reduces the time of exposure of the oxide to the catalyst and the surfaces of the reaction vessel and thus lessens the possibility of isomerizations and the formation of side-reaction products, particularly those which may be highly colored. With our preferred alkaline catalysts, dry sodium hydroxide, potassium hydroxide or their corresponding glycollates, we have successfully used reaction temperatures from about 80° to 160° C., and have obtained substantially clear, uncolored products possessing excellent lubricating properties and which do not deposit sludge, gum-forming or lacquer-forming material, or corrode metal parts when used as metal lubricants. Our best products are obtained with our preferred alkaline catalysts with the reaction temperature maintained from 90° to 130° C., and with a rate of introduction of the alkylene oxides as hereinafter described.

In carrying out the reaction it is desirable, and even essential for best results, to avoid excessive concentration of unreacted alkylene oxides in the reaction zone, especially in the presence of such strongly alkaline catalysts as sodium or potassium hydroxides or glycollates. It is preferred to supply the ethylene oxide and 1,2-propylene oxide to the reaction zone at such a rate as to maintain therein a controlled concentration of unreacted oxide which may be kept uniform and constant or varied as needed up to the end of the reaction. To this end the reaction may be conducted in a closed system and the oxides introduced therein at such a rate as to maintain a substantially uniform pressure during the reaction. Preferably, the pressure should be maintained at about 5 to 50 p. s. i. although under favorable conditions pressures as high as 200 p. s. i. may be used. (By the symbol p s. i. as used herein is meant pounds per square inch, gauge). It is preferred also to cycle the liquid in the reaction vessel, or to agitate it vigorously, in order to wash the walls of the reaction vessel as well as to assist in maintaining intimate contact and a uniform concentration of reactants. Because the presence of oxygen tends to favor the formation of side-reaction products, the reaction vessel should be exhausted, or the air swept out with gaseous nitrogen or the like, before charging the reactor.

For good heat stability of the diol compositions used as metal lubricants, a low ash content is desirable to diminish or avoid sludge formation and the deposition of carbon. The ash content of the oxide addition products may be derived from the catalyst used in making them, and also from any ash-forming, inorganic impurities present in the reaction mixture. By the absence or removal of low-molecular weight glycols and the water associated therewith, the solubility of these ash-forming impurities or substances which are determined as ash, may be greatly decreased to provide metal lubricants of good stability.

For best control in making the diol compositions, it is also desirable to carry out the addition reaction under relatively moisture-free conditions, and to avoid side reactions which form water. To dry the reaction vessels and connections, they may be swept out with dry, oxygen-free gas before introducing the charge. The catalyst should also be dry, or substantially so. The ethylene oxide and 1,2-propylene oxide should preferably be purified to remove moisture and any impurities which are capable of entering into side-reactions which yield water. In order to produce diol compositions of superior heat stability and also to produce products having an average molecular weight from 1,000 to 5,000 or higher, which preferably have only relatively small amounts of polyoxyalkylene glycols of about 300 to 500 in molecular weight, and lower, the moisture content should not exceed about 0.1 per cent by weight. For best results where a low ash content and a correspondingly high heat stability are required, a moisture content not to exceed 0.5 per cent is desirable. It is recognized, however, that there may be a minimum amount or trace below which it is also desirable not to go.

Alkylene oxides of the desired degree of dryness may be obtained by distilling them through an efficient rectifying column or from solution in a hydroscopic glycol or the like; for instance, ethylene glycol, diethylene glycol, propylene glycol or higher members of the glycol series. A hygroscopic liquid may also be used to scrub the vapors of the oxide.

With such a strongly alkaline catalyst as sodium hydroxide, for instance, it is preferable to neutralize the catalyst upon completion of the reaction, with an acid which will react with the catalyst to form a salt having characteristics which favor its ready removal from the reaction product. To this end sulfuric acid and carbon dioxide have been used successfully. Preferably the sulfuric acid is used in aqueous solution. In neutralizing, it is desirable to form salts which are insoluble in the reaction product and which may be removed mechanically, as by hot-filtering. The solubility of the salts may be reduced prior to filtration, by vacuum-stripping from the reaction product, at an elevated temperature, any low-boiling constituents present.

Impurities other than inorganic salts which may be formed in the reaction product under some conditions may include, for instance, alkylene oxide addition products or side-reaction products which are more soluble in water than the diol compositions of the present invention. Because of the relatively high average molecular weight of the diol compositions they cannot readily be distilled in ordinary vacuum equipment, and for the removal of water-soluble impurities it may be found desirable to carry out an extraction step prior to the stripping operation. Water or an aqueous solution may be used as the extractant. Such an extraction may be carried out advantageously at a moderately elevated temperature from about 50° to 95° C. or higher, and under pressure, if need be, because of the decreased miscibility of the product with water and aqueous salt solutions at such temperatures, especially with products of higher oxyethylene content. By way of illustration, a temperature of about 95° to 105° C. or higher may be required for the formation of two separate phases from an aqueous solution containing about 50 per cent of a product having an oxide ratio of 60-40 to 40-60, whereas at oxide ratios of about 25-75 to 10-90 extraction, ordinary temperatures may be satisfactory. In carrying out the extraction, the effect of sodium carbonate in favoring the formation of two phases is quite marked and in many cases two phases may be formed at normal or room temperature by saturating the aqueous solution with sodium carbonate or potassium carbonate. When two phases are developed by heating or salting out, an appreciable amount of the diol composition may remain in the water phase. Upon adding a third component which is a solvent for the diol composition, but a non-solvent for water, the product-solvent phase will contain less water, and less diol composition will be present in the extract phase. Solvents which are suitable as assistants in making the hot-water extractions are dichlordiethyl ether, dibutyl ether, butanol, hexanol, toluene, benzene, ethylene dichloride, and the like. By dissolving the product in such a solvent and washing the resultant solution at a temperature of 95° to 98° C. with successive small portions of water, a substantially ash-free raffinate may be obtained without excessive loss of product. After removing the solvent from the raffinate or product-solvent phase, as by distillation, the residue may be stripped of low-boiling constituents by heating it under reduced pressure which may be as low as about 1 or 2 millimeters of mercury and at an elevated temperature which may reach 180° C. or higher. The use of a solvent is especially suitable in extracting those products which do not readily form two phases on heating their aqueous solutions to about 100° C. Material appearing in the extract or aqueous phase may be recovered by removing the water, as by distillation, and filtering the residue to remove the salt. When extraction is suitably carried out, the stability of the raffinate and its freedom from corrosive action on metals are usually superior to those of the extract.

The properties of diol compositions made with catalysts other than the alkali metal hydroxides may not be precisely the same as for the caustic catalyzed reaction. Boron trifluoride, for instance, may be used in making products having an average molecular weight up to about 1,000. Products of an average molecular weight above this value are not readily prepared with boron trifluoride as a catalyst, and if so prepared, the products, though useful, have properties which differ from the caustic catalyzed product which is preferred. In low concentrations, boron trifluoride seems to be more active as a catalyst than sodium hydroxide and an amount of the trifluoride which is about 0.15 to 0.5 per cent of the total weight of reactants may be used. With this catalyst it is possible to use reaction temperatures from about 50° to 130° C. but a range of about 70° to 90° C. appears to be more suitable. In order to reduce the corrosive action of boron trifluoride on metal equipment and also possibly to reduce side reactions, a small amount of calcium oxide may be added to the reactants. Upon completion of the reaction the neutralization of the catalyst by adding lime in the presence of water, results in the formation of salts which may be removed by filtering or extraction. The removal of any fluoride content from the boron trifluoride-catalyzed product is highly desirable for good stability in a diol composition used as a metal lubricant.

The invention may be illustrated by the following examples:

EXAMPLE 1

*Step 1.*—A polyoxyalkylene glycol starting material of relatively low molecular weight was made by introducing a mixture of 18 parts of ethylene oxide and 6 parts of 1,2-propylene oxide into a suitable reactor charged with 20 parts of diethylene glycol and 1.56 parts of dry, powdered sodium hydroxide intimately dispersed therein. The moisture content of the diethylene glycol was about 0.15 per cent and of the mixed oxides, about 0.07 per cent.

The reaction mixture was vigorously agitated and maintained at a temperature of about 119° to 127° C. throughout the reaction. About 18 minutes were required to feed in the oxides which were supplied at a rate to maintain a pressure of about 16 p. s. i. After all the oxides had been fed in, the reaction mixture was recycled for a period of 30 minutes.

A part of the reaction product was neutralized to a pH of 7 to 8, with concentrated sulfuric acid, and filtered. The product was a liquid which was found to have a viscosity of 26.8 centistokes (127 Saybolt Universal seconds) at 100° F. and an average molecular weight of about 227 was determined by acetyl value.

*Step 2.*—A mixture of 60 parts of ethylene oxide and 20 parts of 1,2-propylene oxide were introduced into a reactor containing 20 parts of the unneutralized product of Step 1 at a rate to maintain a pressure of about 22 to 30 p. s. i. over a period of about one hour. No additional sodium hydroxide was added and the moisture content of the oxides was the same as in Step 1. A temperature of about 111° to 122° C. was maintained during the reaction and the reaction mixture recycled for about one-half hour after all the oxides had been introduced. The product was a liquid which was found to contain about 0.25 per cent of water and to have an alkalinity, calculated as sodium hydroxide of about 0.78 per cent.

A part of the reaction product was neutralized with concentrated sulfuric acid and filtered as in Step 1. It was a liquid having a viscosity of 112.6 centistokes (520 S. U. S.) at 100° F. and an average molecular weight of about 1,060 by acetylation. This diol composition was found also to be miscible in all proportions with cold water and with hot water up to a temperature of about 100° C. and to have a pourpoint below 0° C.

EXAMPLE 2

A mixture of 60 parts of ethylene oxide and 20 parts of 1,2-propylene oxide were supplied over a period of about 1.6 hours to a reactor containing 20 parts of the unneutralized reaction product of Example 1, Step 2, to which 0.35 parts of dry, powdered sodium hydroxide had been added. The moisture content of the oxide mixture was about 0.07 per cent. The pressure in the reactor during the introduction of the oxide was about 24 to 33 p. s. i., and the reaction mixture was recycled for about 0.5 hour after all the oxide had been supplied. During the reaction, the reaction mixture was maintained at a temperature of 115° to 128° C. The resulting product was a liquid which was found to have a moisture content of 0.05 per cent, an alkalinity of 0.49 calculated as sodium hydroxide, and a bromine number of 0.26.

A part of the liquid product was neutralized with concentrated sulfuric acid to a pH of about 7 to 8 and filtered. It was found to have an average molecular weight of about 2,720, by acetylation, and a viscosity of 476 centistokes (2,200 S. U. S.) at 100° F. It was also mis-

Example 3

A mixture of 37.5 parts of ethylene oxide and 12.5 parts of 1,2-propylene oxide were introduced, over a period of about 1.3 hours, into a reactor charged with 50 parts of the unneutralised product of Example 2, at such a rate as to maintain a pressure of about 28 to 35 p. s. i. After all the oxide had been introduced, the reaction mixture was recycled for about 0.5 hour. A temperature of 119° to 152° C. was maintained during the reaction.

The reaction product was a liquid which was found to contain 0.06 per cent of water, and to have an alkalinity of 0.21 per cent calculated as sodium hydroxide, and a bromine number of 0.57.

Upon neutralizing a part of the liquid and filtering, as in the preceding examples, the liquid was found to have a viscosity of 1,168 centistokes (5,400 S. U. S.) at 100° F., an average molecular weight of 4,210 by acetylation, and a pour point below 0° C. An aqueous solution of the diol composition separated into two phases or layers at a temperature of about 95° to 100° C.

Example 4

Following the procedure of the preceding examples, a mixture of 61.5 parts of ethylene oxide and 20.5 parts of 1,2-propylene oxide were reacted with 30 parts of the unneutralized product of Example 1, Step 2, to which 0.4 part of dry, powdered sodium hydroxide had been added. The pressure was maintained at 16 to 23 p. s. i., the temperature at 126° to 133° C., and the oxide was introduced in about 1.6 hours. The reaction mixture then recycled for a period of about 1 hour additional. The reaction product was a liquid having a water content of about 0.13 per cent, and an alkalinity of about 0.56 per cent as sodium hydroxide.

As in the preceding examples, the product was neutralized with concentrated sulfuric acid to a pH of 7 to 8 and filtered. The average molecular weight, by acetylation, was found to be about 2,556 and the viscosity, about 487 centistokes (2,250 S. U. S.) at 100° F. The pourpoint of the diol composition was below 0° C., and it was miscible with water in all proportions up to a temperature of 100° C.

Example 5

To 110 parts of the unneutralized product of Example 4 were added 10 parts of a mixture of ethylene oxide and 1,2-propylene oxide having a 75–25 oxide ratio, according to the procedure of the preceding examples. The temperature was maintained at about 111° to 131° C., and the pressure, at about 36 p. s. i.; and the reaction mixture recycled for about 0.75 hour after all the oxide had been introduced into the reactor. The liquid product which resulted had a water content of about 0.09 per cent, an alkalinity of about 0.52 per cent as sodium hydroxide, and a bromine number of 0.32.

The average molecular weight of the neutralized and filtered product was found, by acetylization, to be about 2,700 and the viscosity at 100° F. was found to be 530 centistokes (2,450 S. U. S.). In other respects the properties were similar to those of Example 2.

The properties of the products of Examples 1 to 5 may be tabulated for comparison as follows:

Table A

| Example | Water, per cent by weight | Alkalinity NaOH | Bromine No. | Av. Molecular Weight (Calculated)[1] | Av. Molecular Weight (by Acetylation) |
|---|---|---|---|---|---|
| 1 (Step 2) | 0.25 | 0.78 | --- | 1,096 | 1,060 |
| 2 | 0.05 | 0.49 | 0.26 | 3,346 | 2,720 |
| 3 | 0.06 | 0.21 | 0.57 | 6,710 | 4,210 |
| 4 | 0.13 | 0.56 | --- | 2,940 | 2,556 |
| 5 | 0.09 | 0.52 | 0.32 | 3,020 | 2,700 |

[1] Calculated from materials charged.

The viscosities of the products of Examples 1 to 5 were determined at various temperatures and the values are given in Table B as follows:

Table B

| Example | 100° F. Centistokes | 100° F. S. U. S. | 210° F. Centistokes | 210° F. S. U. S. |
|---|---|---|---|---|
| 1 (Step 2) | 112.6 | 520 | 17.1 | 86 |
| 2 | 476 | 2,200 | 85.5 | 398 |
| 3 | 1,168 | 5,400 | 161 | 750 |
| 4 | 487 | 2,250 | 59.1 | 275 |
| 5 | 530 | 2,450 | 71 | 330 |

The slopes of the viscosity-temperature curves for all of these products were substantially the same over a range of temperature from 70° to 210° F. Aqueous solutions of these diol compositions were found to be excellent textile lubricants, particularly for the lubrication of animal wool.

Example 6

A mixture containing 75 parts of ethylene oxide and 25 parts of 1,2-propylene oxide was supplied to a reactor charged with 20 parts of diethylene glycol and 0.8 part of dry, powdered sodium hydroxide. The ethylene oxide had a water content of about 0.09 per cent and an acetaldehyde content of about 0.06 per cent and the propylene oxide had a water content of about 0.05 per cent and a propionaldehyde content of about 0.15 per cent. The water content of the diethylene glycol was about 0.15 per cent. The pressure maintained during the introduction of the oxide mixture was about 8 to 18 p. s. i. over a period of about 1.9 hours, and thereafter the mixture was cycled for a period of about 1 hour. During the reaction the temperature was held at 94° to 105° C.

The reaction product was a liquid which was then transferred to a glass-lined kettle provided with a steam-heated jacket, and 15 parts of water added. Carbon dioxide was passed into the aqueous mixture until a pH of 8.5 was reached. The water and other low-boiling constituents were then removed by heating under reduced pressure for a period of 11 hours to a final kettle temperature of 185° C. and a final pressure of 5 mm. of mercury, absolute.

The filtered liquid product was found to have an average molecular weight of 636, by acetylation, a specific gravity of 1.094 (20/20° C.), and a bromine number of 0.20. The average molecular weight calculated from the charge was 557. The viscosity of this diol composition was 61.2 centistokes (285 S. U. S.) at 100° F. and 9.2 centistokes (56.6 S. U. S.) at 210° F. It had a pourpoint below 0° C. and was miscible with water in all proportions up to a temperature of 100° C. As a metal lubricant for use at low loads and moderate temperatures it was found to be resistant to oxidation. Its load carrying capacity, as determined by the S. A. E. machine, was 60 pounds at 305 R. P. M.

EXAMPLE 7

A mixture of 40 parts of ethylene oxide and 40 parts of 1,2-propylene oxide was introduced, over a period of 1.9 hours and at a pressure of 18 to 25 p. s. i., into a reactor charged with 20 parts of diethylene glycol and 1 part of dry, powdered sodium hydroxide. The temperature was held at about 113° to 127° C. during the reaction and the reaction mixture was recycled for about 1 hour after all the oxides had been added. The mixed oxides contained 0.03 per cent aldehyde as acetaldehyde and about 0.12 per cent water.

After a part of the reaction product had been neutralized with concentrated sulfuric acid and filtered as before, it was found to have an average molecular weight of about 482 by acetylization (calculated from charge, 458), a water content of 0.76 per cent, a specific gravity of 1.076 (20/20° C.), and viscosities of 44 centistokes (205 S. U. S.) at 100° F. and 6.55 (47.6 S. U. S.) at 210° F.

EXAMPLE 8

Starting with 20 parts of the unneutralized product of Example 7, to which 0.5 part of dry, powdered sodium hydroxide had been added, 80 parts of an oxide mixture having a 50–50 oxide ratio were supplied to the reactor over a period of 2.6 hours while maintaining the pressure at about 6 to 40 p. s. i. The reaction temperature was held at 102° to 125° C. during the reaction, and the reaction mixture was recycled for about 1 hour after all the oxides had been introduced. The water and aldehyde contents of the reactants were the same as in Example 7.

The properties of the neutralized and filtered product were: average molecular weight, 1,664, by acetylization (calculated from charge, 1,653); specific gravity, 1.067 (20/20° C.); water, 0.33 per cent; viscosities, 148 centistokes (684 S. U. S.) at 100° F. and 24.6 centistokes (118 S. U. S.) at 210° F. This diol composition thus obtained had a pourpoint below —40° F. and was miscible with cold water in all proportions. At temperatures of about 75°–80° C., aqueous solutions of the diol composition separated into two layers. It was useful as a textile lubricant and, where high operating temperatures were not involved, a metal lubricant.

EXAMPLE 9

A product of higher average molecular weight than that of Example 8 was made as follows:

Unneutralized product from Example 8, parts__ 20
Dry, powdered sodium hydroxide__do___ 0.5
Oxide mixture, 50–50 oxide ratio__do___ 80
Temperature _____°C__ 113–121
Pressure_____p. s. i__ 25–44
Time of oxide feeding_____hours__ 4

Except as indicated, the conditions were similar to those obtaining in Example 8. The water content of the mixture of ethylene oxide and 1,2-propylene oxide was 0.12 per cent and the aldehyde content was 0.03 per cent as acetaldehyde. After all the oxide had been fed into the reactor, the reaction mixture was recycled for 1 hour.

The neutralized and filtered product had an average molecular wieght of 3,418, by acetyliza-tion (calculated from charge 3,450); a specific gravity of 1.064 (20/20° C.); a water content of 0.5 per cent, and viscosities of 462.5 centistokes (2,152 S. U. S.) at 100° F. and 70.5 centistokes (328 S. U. S.) at 210° F.

This diol composition also had a pourpoint below —30° C. and it was miscible in all proportions with cold water. At temperatures of 55° to 65° C. two layers were developed on warming aqueous solutions of the product. At moderate temperatures the neutralized and filtered product was useful as a metal lubricant, including heavy loads, and as a textile lubricant it imparted good finish to synthetic fibers, including rayon.

EXAMPLE 10

Using as starting material 20 parts of diethylene glycol and 1 part of dry, powdered sodium hydroxide contained in a suitable reactor, a diol composition was made by supplying thereto 90 parts of an oxide mixture having a 25–75 ratio over a period of 2.2 hours at a pressure of about 32–34 p. s. i. During the reaction the temperature was held at 109°–121° C. and the reaction mixture was recycled for a period of 1.5 hours after all the oxide had been fed. The oxide mixture contained 0.08 per cent of water and 0.01 per cent of aldehyde, as acetaldehyde.

The properties of the neutralized and filtered product having a water content of 0.59 per cent were found to be as follows: average molecular weight, 512, by acetylation (calculated from charge, 505); specific gravity, 1.047 (20°/20° C.); pourpoint, below —50° F., and viscosities of 42.5 centistokes (198 S. U. S.) at 100° F. and 6.37 centistokes (47 S. U. S.) at 210° F. It was miscible with cold water in all proportions, but at a temperature of about 80° to 90° C., two phases were formed from an aqueous solution. At moderate temperatures it had a good load carrying capacity as a metal lubricant.

EXAMPLE 11

A product of higher average molecular weight than that of Example 10 was made by supplying 80 parts of a mixture of ethylene oxide and 1,2-propylene oxide having an oxide ratio of 25–75 to a reactor charged with 20 parts of the unneutralized product of Example 10 and 0.5 part of dry, powdered sodium hydroxide. The temperature was held at 108° to 118° C. during the reaction and the mixture of oxide supplied to the reaction mixture over a period of 4.4 hours with the pressure held at about 30 to 44 p. s. i.

The neutralized and filtered product of the reaction with a water content of about 0.18 per cent was a liquid having a pourpoint below —35° F., an average molecular weight, by acetylation, of 1,685 (calculated from charge, 1,795); a specific gravity of 1.035 (20°/20° C.); and viscosities of 131.4 centistokes (607 S. U. S.) at 100° F. and 21 centistokes (101.6 S. U. S.) at 210° F. It was partially miscible with water at a temperature of 25° C. to the extent of about 30 per cent of the diol composition in aqueous solution and about 40 per cent of water in the diol composition. On heating either of these solutions to a temperature of 27° to 32° C. or above, two layers were formed. The diol composition was useful as a metal lubricant at moderate temperatures, and also in textile lubricants, hydraulic fluids and the like.

EXAMPLE 12

Another product of higher average molecular weight than that of Example 11 was made by adding to 20 parts of the unneutralized product of that example 0.8 part of dry, powdered sodium hydroxide, charged into a reactor, and supplying thereto 80 parts of an ethylene oxide 1,2-propylene oxide mixture having an oxide ratio of 25–75 over a period of 5.4 hours while holding the pressure at 20 to 44 p. s. i. After all the oxides had been added the reaction mixture was recycled for a period of at least an hour, and during the reaction the temperature was maintained at 109° to 121° C.

The neutralized and filtered product having a water content of about 0.15 per cent was found to possess the following properties: average molecular weight, 2,751, by acetylation (calculated from charge, 2,882); specific gravity, 1.032 (20°/20° C.); pourpoint, below −40° C., and viscosities of 350 centistokes (1,620 S. U. S.) at 100° F. and 54.6 centistokes (254 S. U. S.) at 210° F. This diol composition was also not miscible with water except to a limited extent, and the mutual solubility which did not exist was less at higher temperatures than at lower temperatures. It had a good load carrying capacity and it was useful as a metal lubricant at moderate temperatures. Its low pourpoint permitted use at low temperatures.

EXAMPLE 13

To 20 parts of the unneutralized product of Example 12 and 1 part of dry, powdered sodium hydroxide, charged into a reactor, was supplied 80 parts of an ethylene oxide 1,2-propylene oxide mixture having an oxide ratio of 25–75 over a period of 5.6 hours while the pressure was held at 37 to 47 p. s. i. During the reaction the temperature was maintained at 110° to 128° C. In other respects the procedure was similar to that of Example 12.

The neutralized and filtered product having a water content of 0.38 per cent was a liquid having a pourpoint below −20° F., a specific gravity at 20°/20° C. of 1.030, an average molecular weight of 3,088, by acetylation, and viscosities of 536.8 centistokes (2,480 S. U. S.) at 100° F. and 84 centistokes (391 S. U. S.) at 210° F. This diol composition was miscible with water only to about 2 per cent by volume at 25° C. and this slight mutual solubility of water and product decreased with higher temperatures.

EXAMPLE 14

*Step 1.*—A starting material was made according to the procedure of Example 1, Step 1, but with an oxide mixture having a somewhat higher water content but the same oxide ratio, 75–25. The properties of the neutralized and filtered product of the reaction were similar to those of the starting material made in Example 1, Step 1, except for a somewhat lower molecular weight as a consequence of the higher water content of the oxide mixture.

*Step 2.*—Using the above product as a starting material and an oxide mixture having the same slightly higher water content, a diol composition was made following the procedure of Example 1, Step 2. Except for a lower average molecular weight and a lower viscosity, resulting from the water content of the oxide mixture, the properties of the neutralized and filtered product were substantially identical with those of the diol composition of Example 1, Step 2.

EXAMPLE 15

A diol composition was made in accordance with the method of Example 2, using a 75–25 oxide mixture of the same water content as in Example 14 and the unneutralized product of Step 2 as the starting material.

Here again the presence of a small amount of water in the oxide mixture resulted in a lower average molecular weight, and consequently lower viscosity than might otherwise have been expected from the materials charged. In other respects the properties of the neutralized and filtered product were similar to those of the neutralized and filtered product of Example 2.

EXAMPLE 16

The neutralized and filtered product of this example was a liquid having an average molecular weight of about 2,800 to 2,900, a pourpoint below 0° C., and viscosities of 621 centistokes (2,870 S. U. S.) at 100° F. and 82.5 centistokes (390 S. U. S.) at 210° F. It had the same uses as the diol compositions of Examples 2 and 5. It was made according to the procedure of Example 2, using a 75–25 oxide mixture of higher water content and the unneutralized product of Example 15 as the starting material.

EXAMPLE 17

*Step 1.*—Into a reactor charged with 30 parts of propylene glycol and 0.5 part of dry, flake sodium hydroxide was introduced 80 parts of an oxide mixture having an oxide ratio of 10–90. The mixture was introduced at a rate to maintain a pressure of not more than about 50 p. s. i.; the temperature was held at 110° to 120° C., and about 5.5 hours were required to complete the reaction. To 30 parts of the resulting reaction mixture were then added 0.5 part of dry, flake sodium hydroxide and 34 parts of an oxide mixture having the same oxide ratio, 10–90, as before. The temperature was held at 108° to 115° C., the pressure at 0 to 45 p. s. i., and 3.25 hours were required for the reaction to be completed. The unneutralized reaction product was used as the starting material in the following step.

*Step 2.*—To 56 parts of the unneutralized product of the preceding step was added 54 parts of an oxide mixture having a ratio, as before, of 10–90. The pressure was held at 10 to 55 p. s. i., the temperature at 108° to 120° C., and a period of 5 hours was required to complete the reaction. A part of the product was neutralized with carbon dioxide followed by extraction with water to remove sodium carbonate. The neutralized reaction product was then stripped of water and low-boiling constituents by heating under a reduced pressure as low as 20 millimeters of mercury and an elevated temperature as high as 165° C., and thereafter filtered while hot. The resultant diol composition was a clear, colorless liquid having the properties of the lowest member of the 10–90 series set forth in Table C.

Following the same procedure, five additional diol compositions having an oxide ratio of 10–90 were produced by utilizing the product of one reaction as the starting material for a diol composition of higher viscosity and increased average molecular weight. The properties of the diol compositions thus obtained are listed in Table C.

In addition to the diol compositions of which the foregoing examples are illustrative, a number of additional compositions have been made over a range of oxide ratios from 75–25 to 10–90, using as catalyst, sodium hydroxide. Table C summarizes some of the properties of these products.

In each of the series of diol compositions tabulated under the oxide ratio, the product of lower average molecular weight served as the starting material for making the composition of next higher average molecular weight, except in the case of some of the members of lowest average molecular weight where the starting material was a monoglycol. The ultimate starting material for each series, however, was 1,2-propylene glycol, which was charged into a suitable reactor and caustic catalyst added. The mixed oxides were then introduced at a rate to maintain a pressure from 5 to 70 p. s. i. while the temperature was held at about 110° to 122° C. during the reaction. After the reaction was completed, the reaction mixture was neutralized with carbon dioxide and washed with hot water at a temperature of 90°–95° C. To assist the maintenance of two phases during washing, the diol composition phase was dissolved in dichlordiethyl ether. Thereafter the diol composition was stripped of its low-boiling constituents at a reduced pressure as low as 20 millimeters at an elevated temperature up to 180° C., and filtered. The products were clear, uncolored liquids.

This invention is susceptible of modification within the scope of the appended claims.

We claim:

1. A mixture of heteric oxyethylene-oxy 1,2-propylene diols in which ethylene oxide and 1,2-propylene oxide are combined therein as oxyethylene and oxy 1,2-propylene groups in a ratio which is at least one-third part of 1,2-propylene oxide for each part of ethylene oxide, by weight; said diols containing in a single molecule both the oxyethylene and the oxy 1,2-propylene groups and said mixture having an average molecular weight of at least 300 attributable to said groups.

2. A mixture of heteric oxyethylene-oxy 1,2-propylene diols in which ethylene oxide and 1,2-propylene oxide are combined therein as oxyethylene and oxy 1,2-propylene groups in a ratio from one-third to about nine parts of 1,2-propylene oxide for each part of ethylene oxide, by weight; said diols containing in a single molecule both the oxyethylene and the oxy 1,2-propylene groups and said mixture having an average mo-

*Table C*

| Average Mol. Wt. | Specific Viscosity,[1] 18° C. | Density, 210° F. | Refractive Index, 20° C./D | Flash Temperature, 0° F. | Viscosity Centistokes | | | |
|---|---|---|---|---|---|---|---|---|
| | | | | | 210° F. | 100° F. | 20° F. | 0° F. |
| 75-25 DIOLS | | | | | | | | |
| 500 | 0.1006 | 1.0227 | 1.4672 | 410 | 7.32 | 45.7 | ------ | ------ |
| 1,108 | 0.1811 | 1.0296 | 1.4671 | 446 | 17.5 | 106 | ------ | ------ |
| 1,200 | 0.2213 | 1.0299 | 1.4670 | 453 | 23.0 | 143 | ------ | ------ |
| 1,243 | 0.2294 | 1.0305 | 1.4675 | 448 | 26.2 | 164 | ------ | ------ |
| 2,590 | 0.3823 | 1.0299 | 1.4669 | 469 | 66.7 | 420 | ------ | ------ |
| 3,525 | 0.4286 | 1.0296 | 1.4668 | 460 | 88.9 | 578 | ------ | ------ |
| 4,230 | 0.4930 | 1.0290 | 1.4662 | 439 | 99.7 | 716 | ------ | ------ |
| 4,940 | 0.5795 | 1.0235 | 1.4655 | 313 | 144 | 979 | ------ | ------ |
| 5,043 | 0.6217 | 1.0278 | 1.4653 | 437 | 181 | 1,323 | ------ | ------ |
| 5,522 | 0.6680 | 1.0275 | 1.4651 | 419 | 196 | 1,552 | ------ | ------ |
| 6,365 | 0.7002 | 1.0270 | 1.4612 | 406 | 257 | 1,980 | ------ | ------ |
| 50-50 DIOLS | | | | | | | | |
| 409 | ---------- | 0.9933 | 1.4554 | 381 | 5.74 | 37.5 | 895 | 3,639 |
| 1,006 | 0.1529 | 0.9990 | 1.4588 | 441 | 12.5 | 76.3 | 1,626 | 7,055 |
| 1,911 | 0.2535 | 1.0051 | 1.4605 | 471 | 28.7 | 175 | 3,925 | 15,071 |
| 2,436 | 0.3280 | 1.0030 | 1.4606 | 462 | 43.2 | 274 | 6,424 | ------ |
| 3,250 | 0.4145 | 1.0034 | 1.4609 | 459 | 71.1 | 468 | 10,724 | ------ |
| 3,508 | 0.4769 | 1.0020 | 1.4610 | 453 | 85.2 | 583 | 13,504 | ------ |
| 25-75 DIOLS | | | | | | | | |
| 556 | 0.0966 | 0.9699 | 1.4524 | 417 | 6.71 | 43.4 | 936 | 3,313 |
| 1,072 | 0.1141 | 0.9739 | 1.4545 | 446 | 12.1 | 74.6 | 1,465 | 5,137 |
| 1,524 | 0.1811 | 0.9729 | 1.4551 | 437 | 18.3 | 114 | 2,217 | 7,566 |
| 2,406 | 0.2817 | 0.9739 | 1.4557 | 423 | 35.8 | 221 | 4,210 | 19,989 |
| 3,238 | 0.3521 | 0.9723 | 1.4560 | 430 | 53.1 | 340 | 6,436 | ------ |
| 10-90 DIOLS | | | | | | | | |
| 801 | 0.1066 | 0.9557 | 1.4513 | 450 | 8.41 | 56.8 | 1,235 | 4,930 |
| 1,092 | 0.1328 | 0.9556 | 1.4518 | 451 | 11.7 | 77.4 | 1,631 | 6,546 |
| 1,861 | 0.1771 | 0.9548 | 1.4523 | 457 | 19.9 | 130 | 2,690 | 10,131 |
| 2,952 | 0.2897 | 0.9548 | 1.4530 | 453 | 38.9 | 257 | 5,182 | 31,059 |
| 3,701 | 0.3541 | 0.9557 | 1.4532 | 442 | 60.4 | 402 | 7,860 | ------ |
| 4,186 | 0.4004 | 0.9562 | 1.4533 | 435 | 73.5 | 500 | 9,956 | ------ |

[1] In benzene solution containing 4 per cent of diol composition, by weight.

The values for the average molecular weights were calculated from the acetyl values of the compositions and are based on the assumption that each molecule contains two hydroxyl groups.

By the symbol S. U. S. is meant Saybolt Universal seconds as a measure of viscosity.

Unless otherwise specified herein, all parts or proportions are by weight.

This application is, in part, a continuation of applications Serial Nos. 399,948 and 437,722 filed June 26, 1941, and April 4, 1942, respectively.

lecular weight of at least 300 attributable to said groups.

3. A mixture of heteric oxyethylene-oxy 1,2-propylene diols in which ethylene oxide and 1,2-propylene oxide are combined therein as oxyethylene and oxy 1,2-propylene groups in a ratio from one-third to about one part of 1,2-propylene oxide for each part of ethylene oxide, by weight; said diols containing in a single molecule both the oxyethylene and the oxy 1,2-propylene groups and said mixture having an average molecular weight of at least 300 attributable to said groups.

4. A mixture of heteric oxyethylene-oxy 1,2-propylene diols in which ethylene oxide and 1,2-propylene oxide are combined therein as oxyethylene and oxy 1,2-propylene groups in a ratio from about one to about nine parts of 1,2-propylene oxide for each part of ethylene oxide, by weight; said diols containing in a single molecule both the oxyethylene and the oxy 1,2-propylene groups and said mixture having an average molecular weight of at least 300 attributable to said groups.

5. A mixture of heteric oxyethylene-oxy 1,2-propylene diols in which ethylene oxide and 1,2-propylene oxide are combined therein as oxyethylene and oxy 1,2-propylene groups in a ratio from one-third to about nine parts of 1,2-propylene oxide for each part of ethylene oxide, by weight; said diols containing in a single molecule both the oxyethylene and the oxy 1,2-propylene groups and said mixture having an average molecular weight attributable to said groups of at least 300 for mixtures having from one-third part to three parts of 1,2-propylene oxide for each part of ethylene oxide and an average molecular weight of at least 800 for mixtures having nine parts of 1,2-propylene oxide for each part of ethylene oxide.

6. A mixture of heteric oxyethylene-oxy 1,2-propylene diols in which ethylene oxide and 1,2-propylene oxide are combined therein as oxyethylene and oxy 1,2-propylene groups in a ratio which is at least one-third part of 1,2-propylene oxide for each part of ethylene oxide, by weight; said diols containing in a single molecule both the oxyethylene and the oxy 1,2-propylene groups and said mixture having an average molecular weight of at least 1,000 attributable to said groups.

7. A mixture of heteric oxyethylene-oxy 1,2-propylene diols in which ethylene oxide and 1,2-propylene oxide are combined therein as oxyethylene and oxy 1,2-propylene groups in a ratio from one-third to about nine parts of 1,2-propylene oxide for each part of ethylene oxide, by weight; said diols containing in a single molecule both the oxyethylene and the oxy 1,2-propylene groups and said mixture having an average molecular weight of at least 1,000 attributable to said groups.

8. A mixture of heteric oxyethylene-oxy 1,2-propylene diols in which ethylene oxide and 1,2-propylene oxide are combined therein as oxyethylene and oxy 1,2-propylene groups in a ratio from one-third to about one part of 1,2-propylene oxide for each part of ethylene oxide, by weight; said diols containing in a single molecule both the oxyethylene and the oxy 1,2-propylene groups and said mixture having an average molecular weight of at least 1,000 attributable to said groups.

9. A mixture of heteric oxyethylene-oxy 1,2-propylene diols in which ethylene oxide and 1,2-propylene oxide are combined therein as oxyethylene and oxy 1,2-propylene groups in a ratio from about one to about nine parts of 1,2-propylene oxide for each part of ethylene oxide, by weight; said diols containing in a single molecule both the oxyethylene and the oxy 1,2-propylene groups and said mixture having an average molecular weight of at least 1,000 attributable to said groups.

10. A mixture of heteric oxyethylene oxy 1,2-propylene diols in which ethylene oxide and propylene oxide are combined therein as oxyethylene and oxy 1,2-propylene groups in a ratio of at least one-third part of 1,2-propylene oxide for each part by weight of ethylene oxide, said mixture having an average molecular weight of not less than 1,000 and being substantially free of oxyethylene-oxy 1,2-propylene diols of molecular weights below 500; the diols of said mixture containing in a single molecule both the oxyethylene group and the oxy 1,2-propylene group.

11. A mixture of heteric oxyethylene-oxy 1,2-propylene diols in which ethylene oxide and propylene oxide are combined therein as oxyethylene and oxy 1,2-propylene groups in a ratio of at least one-third part of 1,2-propylene oxide for each part by weight of ethylene oxide, said mixture having an average molecular weight of about 1,000 to 6,000 and being substantially free of oxyethylene-oxy 1,2-propylene diols of molecular weights below 500; the diols of said mixture containing in a single molecule both the oxyethylene group and the oxy 1,2-propylene group.

12. A mixture of heteric oxyethylene-oxy 1,2-propylene diols in which ethylene oxide and propylene oxide are combined therein as oxyethylene and oxy 1,2-propylene groups in a ratio of at least one part of 1,2-propylene oxide for each part by weight of ethylene oxide, said mixture having an average molecular weight of about 1,000 to 6,000 and being substantially free of oxyethylene-oxy 1,2-propylene diols of molecular weights below 500; the diols of said mixture containing in a single molecule both the oxyethylene group and the oxy 1,2-propylene group.

13. Method of making a mixed oxyethylene-oxy 1,2-propylene diol addition product which comprises adding to an aliphatic alcohol having two alcoholic hydroxyl groups to the molecule a substantially aldehyde-free and water-free mixture of ethylene oxide and 1,2-propylene oxide in which said oxides are present in a ratio from about three parts of ethylene oxide and one part of 1,2-propylene oxide to about one part of ethylene oxide and three parts of 1,2-propylene oxide, said mixture being added at such rate as to maintain a substantially uniform concentration of unreacted oxide throughout the reaction period while maintaining the reaction mixture at a temperature of about 80° C. to 160° C. and at a pressure of about 5 to 200 pounds per square inch, gauge.

14. Method of making a mixed oxyethylene-oxy 1,2-propylene glycol addition product which comprises adding to an alkylene glycol a substantially aldehyde-free and water-free mixture of ethylene oxide and 1,2-propylene oxide in which said oxides are present in a ratio from one-third to about three parts of 1,2-propylene oxide for each part of ethylene oxide, by weight; said mixture being added at such rate as to maintain a substantially uniform concentration of unreacted oxide throughout the reaction period while maintaining the reaction mixture at a temperature of about 100° C. to 130° C. and at a pressure of about 5 to 50 pounds per square inch, gauge.

15. In a process for making a polyoxyethylene-oxy 1,2-propylene diol addition product of a mixture of ethylene oxide and 1,2-propylene oxides in which said oxides are present in a ratio from one-third to about three parts of 1,2-propylene oxide for each part of ethylene oxide, by weight; the steps which include extracting the reaction product with water to form a raffinate phase and an extract phase; and thereafter stripping the raffinate phase of water and low-boiling constituents at a reduced pressure and an elevated temperature up to about 200° C.

16. A textile lubricant composition including as an essential base lubricant thereof a mixture of oxyethylene-oxy 1,2-propylene diols in which ethylene oxide and 1,2-propylene oxide are combined therein as oxyethylene and oxy 1,2-propylene groups in a ratio of about one-third part to one part of 1,2-propylene oxide for each part of ethylene oxide by weight; said mixture having an average molecular weight of not less than 1,000, the diols of said mixture containing in a single molecule both the oxyethylene group and the oxy 1,2-propylene group; and water as a viscosity-reducing diluent for said base lubricant.

WALTER J. TOUSSAINT.
HARVEY R. FIFE.